Dec. 31, 1957     R. N. KLEIN ET AL     2,818,293
TROPHY MOUNT
Filed Oct. 27, 1955
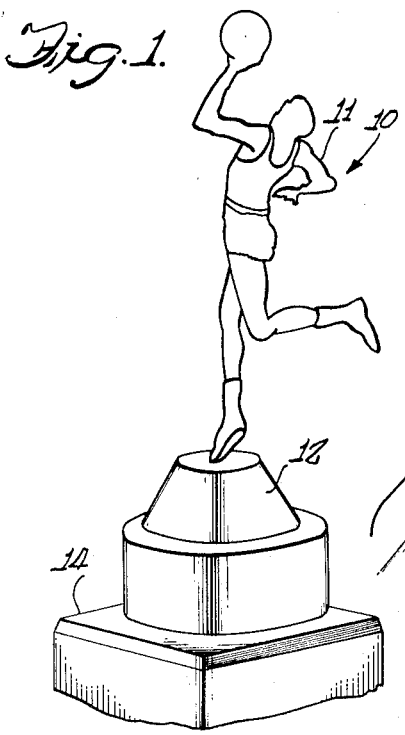
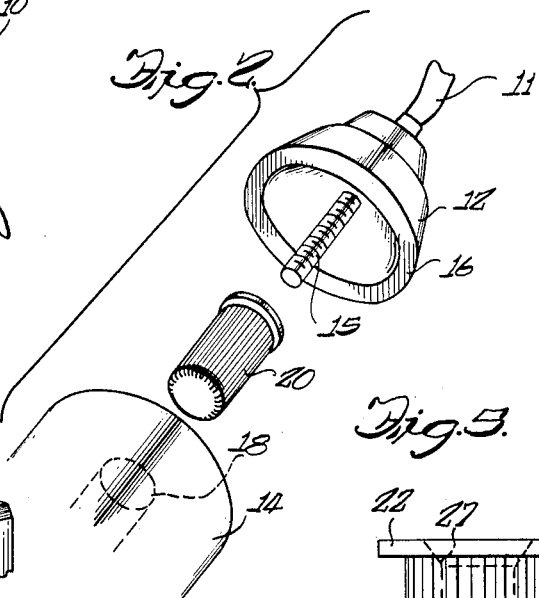
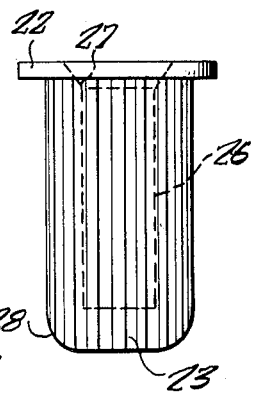
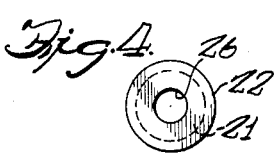
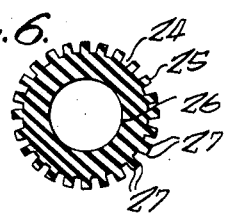
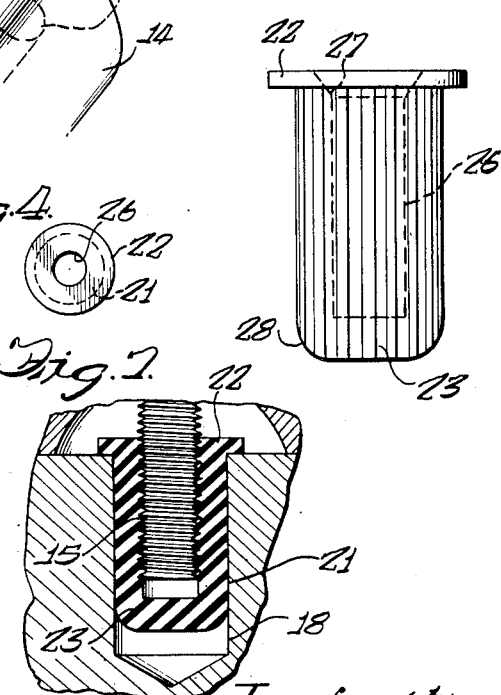
Inventors
Raymond N. Klein
Charles L. Corda United States Patent Office 2,818,293
Patented Dec. 31, 1957

2,818,293

TROPHY MOUNT

Raymond N. Klein, Berwyn, and Charles L. Corda, Chicago, Ill., assignors to Dodge, Inc.

Application October 27, 1955, Serial No. 543,149

2 Claims. (Cl. 287—125)

The present invention relates to the general field of mounting sockets. It finds particular, although not exclusive, utility in serving as a coupling element for fixing figurines to a trophy base.

Heretofore various expedients have been employed to mount trophy figurines to their respective bases. In some instances a threaded shaft extends from the bottom of the figurine to be screwed into a threaded hole in the trophy base. In such cases, although the mount may be secure, the threads can be damaged by an overzealous amateur assembler. Also, once the entire thread is engaged, the figurine cannot be satisfactorily aligned without reducing the effectiveness of the connection.

Those devices using spring loaded couplings and the like may serve to provide for adjustment and a satisfactory connection, but the number of parts involved make such units invariably complex and expensive.

Consequently, it is the general object of the present invention to provide a mounting socket which is inexpensive to manufacture and assemble in a mounting base while still providing for accurate alignment. A related object of the invention is to provide a mounting socket which has a wide safety factor against damage incurred through abusive handling.

Another object of the invention is to provide a mounting socket which is self locking within its mount.

Still another object of the invention is to furnish a unitary mounting socket and cap which serves the purpose of both a mounting sleeve and washer.

Further objects and advantages of the present invention will become apparent as the following specification proceeds, taken in conjunction with the accompanying drawings of an illustrative embodiment of the invention in which:

Figure 1 is a perspective view of a typical trophy in which the invention may be employed.

Figure 2 is an exploded view of the trophy mounting base illustrating the relationship between the figurine, the socket, and the trophy base.

Figure 3 is a front elevation of the mounting socket.

Figure 4 is a top view of the mounting socket shown in Figure 3.

Figure 5 is an enlarged elevational view of the mounting socket shown in Figure 3 with certain of its major dimensions indicated.

Figure 6 is a sectional view in enlarged scale of the mounting socket taken along section line 6—6 of Figure 5.

Figure 7 is an enlarged cross-sectional view of the mounting socket showing its engaged relationship with the trophy base and figurine mounting shaft.

As will be seen from the drawings, and particularly Figures 1 and 2, the mounting socket is specially adaptable for use in securing the figurine of a trophy to its base. Referring now more particularly to Figure 1, there it will be seen that the trophy 10 comprises a figurine 11, in the present instance shown as a basketball player. The pedestal 12 which is cast integral with the figurine is joined to a mounting base 14.

Referring now to Figure 2, the assembled relationship of the figurine 11 and mounting base 14 will be more fully appreciated. There the base portion 12 of the figurine 11 has an integral extending threaded shaft 15 which projects downwardly from the base 16 of the figurine pedestal 12. The mounting base 14 has a centrally bored hole 18 into which the mounting socket 20 is inserted.

Before describing the details of the mounting socket and the unique nature of its action, it will be helpful to appreciate its normal usage. Normally the trophy bases and figurines are manufactured separately. The trophy bases are usually stock items, whereas the figurines represent a wide variety of activities. In order to provide a wider selection for the customers, many standard figurines and trophy bases are provided. The customer makes his choice of the combination and thereafter the two units are assembled.

Naturally, since the figurine base normally mounts to the trophy base by means of a threaded shaft, there arises the two-fold problem of insuring the shaft against breakage and providing for satisfactorily aligning the figurine with the trophy base. Because the base oftentimes has an engraved plaque which should bear a relationship to the orientation of the figurine, alignment is important.

By employing the mounting socket as illustrated and to be described in detail, the user need only insert the mounting socket 20 into the centrally bored hole 18 in the mounting base 14, and then thread the extending shaft 15 from the figurine base into the hollow central portion of the socket 20. When the shaft 15 is threaded completely into the socket it will expand the socket 20 to firmly imbed it within the trophy base 14, while at the same time the resiliency of the material of the mounting socket 20 permits the user to align the figurine 11 without stripping the threads of the mounting shaft 15. The nature of the holding action of the mounting socket against the trophy base will be described in greater detail later.

Referring now to Figure 3 of the drawings, it will be seen that the mounting socket 20 has a body portion 21 terminating in a collar 22 at the upper end. The principal purpose of the collar 22 is to prevent losing the socket within the bore 18 of the mounting base 14. Since the mounting bases are normally made of wood, quite often walnut or a similar wood, and bored without selection as to grain, the depth of the bore 18 will vary considerably. As a result it is desirable to limit the depth to which the socket extends. Thus, the collar must have a sufficient diameter to seat the mounting socket on the base. In practice it has been found that if the collar diameter exceeds the diameter of the main body 21 of the mounting socket 20 by 25% that this result will follow. It will also be noted that the lower end of the socket body 21 has a tapered nose portion 28 to facilitate inserting the socket into the bore 18 of the mounting base.

The outside portion of the main body presents a unique ribbed or reeded surface which serves a number of purposes. As will be seen in Figure 6, the ribs 25 extend radially from the center of the central bore 26 of the mounting socket, and are oriented in a pattern parallel with the longitudinal axis of the central bore 26.

So long as the general configuration is ribbed within certain limits, the mounting socket will perform satisfactorily. It will be appreciated that if the ribs are too narrow, they will fold over when the socket is inserted in the mounting base bore 18 and fail to assert an effective gripping action. On the other hand, if the ribs are too wide, sufficient gripping edges 27 are not provided. It has been determined that if the ribs cover approximately 20 to 80% of the surface area of the mounting socket body 21, they will operate effectively to secure the socket against rotation as well as dislodgment when the figurine is mounted to the base.

It is also desirable to make the overall diameter of the socket body 21 of such a proportion that it exceeds the diameter of the mounting base bore 18 by approximately 5%. For example, if the mounting base bore is a nominal ⅜" diameter, the diameter of the mounting socket body 21 measured from the outside of diametrically opposed ribs should be 25/64".

The central bore 26, as shown in Figures 5, 6 and 7, runs axially through the body of the mounting socket 20. Since the oversize diameter of the mounting socket body 21 will cause some contraction of the diameter of the mounting socket central bore 26 when it is inserted into the mounting base bore 18, the diameter of the mounting socket central bore 26 should be chosen as the effective bore when the socket is in place in the mounting base 14. The diameter of the central bore 26, when the mounting socket is inserted in the mounting base 14, should not exceed the root diameter of the threads of the threaded shaft 15 on the figurine intended for use with the mounting socket.

As will be seen best in Figure 5, the upper portion of the central bore 26 has a tapered neck 27 to facilitate threading the mounting shaft 15 into the socket. The depth of the central bore 26 is preferably 2½ times the diameter of the threaded shaft 15 to insure adequate engagement between the threads of the shaft 15 and the inner surface of the mounting bore 26.

When the mounting socket 20 is inserted into the mounting base 14, normally a factory operation, a jig in the form of a blunt edged circular shaft is employed to press it into the mounting base bore 18. Because some force is required in this operation, the bottom wall 23 of the socket body 21 should be of sufficient thickness to resist any penetrating force that such a blunt edged jig might exert.

Normally when the customer receives the trophy, the figurine 11 is shipped separately from the base 14. The customer then threads the figurine onto the base by inserting the threaded mounting shaft 15 into the mounting socket 20 which has already been placed within the central bore 18 of the mounting base 14. As the threaded shaft 15 progressively penetrates the central bore 26 of the mounting socket 20, it deformingly engages the mounting socket and makes its own threads. This action progressively tends to expand the overall diameter of the mounting socket body 21 crushing the ribs 25 in contact with the mounting bore 18. The edges 27 of the ribs then bite into the wall of the base bore 18 and prevent the socket from rotating while the threading continues. After the base portion 16 of the figurine engages the top of the mounting base 18, the rib edges 27 also anchor the mounting socket 20 against axial displacement. The material from which the mounting socket 20 is made, however, provides sufficient resiliency to permit the user then to align the figurine for a proper orientation with relation to the base 14. It will be appreciated that where several such mounting stations are required on a single trophy, the employment of a plurality of mounting sockets will appreciably increase the dimensional tolerance of the center distances between the various mounting locations, and accordingly reduce the cost of fabricating the unit.

Should the user wish to remove the mounting socket 20, this can be readily done by unscrewing the threaded mounting shaft 15 until only a few threads remain in engagement with the central bore 26 of the mounting socket. Then the enlarged effect of the threaded shaft affects only a minor portion of the length of the main body 21, and the socket may be removed by then pulling the threaded shaft upwardly.

Although the invention is not limited to the specific type of material employed for the making of the mounting socket 20, it has been found that rubber and neoprene will perform satisfactorily, particularly if a medium to hard grade of rubber is used. If the material is too soft, of course, it will tend to tear and not firmly engage the threaded shaft of the figurine.

Although a particular embodiment of the invention has been shown and described in full here, there is no intention to thereby limit the invention to the details of such embodiment. On the contrary, the intention is to cover all modifications, alternative embodiments, usages and equivalents of the trophy mount as fall within the spirit and scope of the invention, specification and appended claims.

I claim as my invention:

1. A trophy and adjustable mount therefor comprising, in combination, a figurine having a base, a threaded shaft extending from the figurine base, a trophy base having a bore in its upper portion, an aligning and mounting socket for insertion into the trophy base bore, the mounting socket comprising a cylindrical rubber body having a trophy shaft receiving bore, the diameter of said bore being not less than the root diameter of the threaded shaft, the outside diameter of the mounting socket body exceeding the trophy base bore diameter by at least 5%, a plurality of longitudinal lands and grooves uniformly disposed on the periphery of the body, the lands presenting an area of 20% to 80% of the external cylindrical surface of the body, each land having two straight flanking edges, a rounded nose at the bottom of the socket and a collar at the upper end of the body to hold the socket at the upper portion of the trophy base bore.

2. A trophy and adjustable mount therefor comprising, in combination, a figurine having a base, a threaded shaft extending from the figurine base, a trophy base having a bore in its upper portion, the trophy base bore being at least two and one-half times the diameter of the threaded shaft, an aligning and mounting socket for insertion into the trophy base bore, the mounting socket comprising a cylindrical rubber body having a trophy shaft receiving bore, the diameter of said bore being not less than the root diameter of the threaded shaft, the outside diameter of the mounting socket body exceeding the trophy base bore diameter by at least 5%, a plurality of longitudinal lands and grooves uniformly disposed on the periphery of the body, the lands presenting an area of 20% to 80% of the external cylindrical surface of the body, each land having two straight flanking edges, a rounded closed nose at the bottom of the socket to retain the air compressed within the socket shaft bore when inserted while the outside grooves relieve the air pressure generated when the socket is inserted in the trophy base bore, and a collar at the upper end of the body to hold the socket at the upper portion of the trophy base bore.

References Cited in the file of this patent

UNITED STATES PATENTS 2,061,811   Sinko _____ Nov. 24, 1936